United States Patent
Flennert et al.

(10) Patent No.: US 11,730,141 B2
(45) Date of Patent: *Aug. 22, 2023

(54) METHOD FOR MATCHING A SENSOR DEVICE TO AN IDENTITY (ID) TAG FOR ANIMALS AND SYSTEM FOR PERFORMING SUCH METHOD

(71) Applicant: DELAVAL HOLDING AB, Tumba (SE)

(72) Inventors: Thomas Flennert, Tumba (SE); Anders Kvist, Tumba (SE); Gert Winkler, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,259

(22) Filed: Dec. 21, 2022

(65) Prior Publication Data
US 2023/0120033 A1    Apr. 20, 2023

Related U.S. Application Data

(63) Continuation of application No. 16/481,184, filed as application No. PCT/SE2018/050041 on Jan. 19, 2018, now Pat. No. 11,559,038.

(30) Foreign Application Priority Data

Feb. 3, 2017    (SE) .................................. 1750088-5

(51) Int. Cl.
*A01K 11/00* (2006.01)
*H04W 4/38* (2018.01)
(Continued)

(52) U.S. Cl.
CPC .......... *A01K 11/006* (2013.01); *A01K 29/005* (2013.01); *H04W 4/029* (2018.02); *H04W 4/38* (2018.02); *A01K 11/004* (2013.01)

(58) Field of Classification Search
CPC .. A01K 29/005; A01K 11/006; A01K 11/004; A01K 11/008; A01K 11/007;
(Continued)

(56) References Cited

U.S. PATENT DOCUMENTS 7,916,013 B2 * 3/2011 Stevenson .............. A61B 90/90
128/903
9,000,929 B2 * 4/2015 Hayter ............... A61B 5/14546
340/539.22

(Continued)

FOREIGN PATENT DOCUMENTS

AU    2006318459 A1 *  7/2008  .......... A01K 11/008
CN       204445849 U     7/2015
(Continued)

OTHER PUBLICATIONS

International Search Report, dated Apr. 10, 2018, from corresponding PCT application No. PCT/SE2018/050041.
(Continued)

*Primary Examiner* — Dung Hong
(74) *Attorney, Agent, or Firm* — Nixon & Vanderhye

(57) ABSTRACT

A system and method for automatically matching a sensor device attached to an animal with an ID tag attached to the animal, wherein a handheld reader device triggers transmission of sensor device information from the sensor device and triggers transmission of ID information from the ID tag, and a monitoring device, in communication with the handheld reader device, is configured to determine and record that the ID tag and the sensor device are attached to a same animal
(Continued)

based on time information associated with both the ID information transmitted from the ID tag and the sensor device information transmitted from the sensor device.

9 Claims, 8 Drawing Sheets

(51) Int. Cl.
*H04W 4/029* (2018.01)
*A01K 29/00* (2006.01)

(58) Field of Classification Search
CPC .... A01K 27/001; A01K 11/00; A01K 11/001; H04W 4/38; H04W 4/029
See application file for complete search history.

(56) References Cited

U.S. PATENT DOCUMENTS

| | | | | |
|---|---|---|---|---|
| 2006/0244568 | A1* | 11/2006 | Tong | G01D 21/00 340/10.41 |
| 2009/0187392 | A1* | 7/2009 | Riskey | A61B 5/4238 703/11 |
| 2010/0253520 | A1* | 10/2010 | Lauronen | H04L 67/12 340/572.1 |
| 2010/0256948 | A1* | 10/2010 | Wright | G06Q 50/02 702/150 |
| 2010/0277283 | A1* | 11/2010 | Burkart | G06Q 10/00 340/10.3 |
| 2010/0277285 | A1* | 11/2010 | Anderson | H04Q 9/00 340/10.4 |
| 2011/0082891 | A1* | 4/2011 | Yamamura | G06Q 30/02 707/802 |
| 2011/0181399 | A1* | 7/2011 | Pollack | G06K 19/0717 340/10.33 |
| 2015/0282457 | A1* | 10/2015 | Yarden | A61D 17/002 340/573.2 |

FOREIGN PATENT DOCUMENTS

| | | | | |
|---|---|---|---|---|
| EP | 1704893 | A1 | 9/2006 | |
| JP | 2002-42082 | A | 2/2002 | |
| JP | 2002042082 | A * | 2/2002 | |
| KR | 20140072232 | A * | 8/2004 | ........... A61D 17/002 |
| KR | 100967920 | B1 * | 7/2010 | ........... A47K 13/105 |
| KR | 10-2014-0072232 | A | 6/2014 | |
| KR | 20140072232 | A * | 6/2014 | ........... A61D 17/002 |
| WO | 2004/064670 | A1 | 8/2004 | |
| WO | WO-2004064670 | A1 * | 8/2004 | ........... A61D 17/002 |

OTHER PUBLICATIONS

Swedish Search Report, dated Jun. 27, 2017, from corresponding SE application No. 1750088-5.

Schoenig et al., "Ambulatory Instrumentation Suitable for Long-Term Monitoring of Cattle Health", Proceedings for the 26th Annual International Conference of the IEEE EMBS, 2004.

Kim et al., "Animal Situation Tracking Service Using RFID, GPS and Sensors", Second International Conference on Computer and Network Technology, 2010 Second International Conference on Apr. 23, 2010, 2010.

* cited by examiner

METHOD FOR MATCHING A SENSOR DEVICE TO AN IDENTITY (ID) TAG FOR ANIMALS AND SYSTEM FOR PERFORMING SUCH METHOD

CROSS REFERENCE TO RELATED APPLICATIONS

This application is a Continuation of application Ser. No. 16/481,184, filed on Jul. 26, 2019, which is the National Phase under 35 U.S.C. § 371 of International Application No. PCT/SE2018/050041, filed on Jan. 19, 2018, which claims the benefit under 35 U.S.C. § 119(a) to Patent Application No. 1750088-5, filed in Sweden on Feb. 3, 2017, all of which are hereby expressly incorporated by reference into the present application.

TECHNICAL FIELD

The present disclosure relates to monitoring of animals and in particular to matching of a sensor device, such as an activity meter, to an Identity, ID, tag both being attached to the same animal.

BACKGROUND

When keeping animals, e.g. on a farm, it is generally desired to monitor them in order to e.g. detect any animal acting differently than usual. An animal behaving differently than usual may be a sign of illness, or e.g. that the animal is in heat. Such issues should be detected as soon as possible in order to take appropriate action(s). The animals may be kept e.g. in a barn or in a fenced open field or pasture.

One obvious way to monitor is to sit and look at the animal, however, that is very undesirable and also costly, so some sort of automated monitoring or supervision is preferred.

One solution to obtain more detailed information of activities of individual animals is to attach one or more sensors to the animals that sense and register their movements. Such sensors may be referred to as activity meters. An example of such a sensor is an accelerometer, which may be fastened e.g. around the neck of an animal and may then sense movements, e.g. of the head and neck of the animal. In this manner, detailed information may be obtained about the movements and activities of the animal. Activity meters are typically not used for positioning of animals, i.e. for determining their absolute location and movements. For such purposes different positioning solutions are used.

Generally, a sensor device, such as an activity meter has its own specific identity, which in may comprise e.g. a series of letters, integers and/or signs in any combination. In order to know to which animal data or reports from such an activity meter is related, the activity meter needs to be associated with a specific animal in a register. Further, activity meters are often reused on different animals, and in such cases, the animal to which the activity meter is associated needs to be changed in the register. This work is done by people working with the animals. The inventors have identified that this is a very time consuming and cumbersome work, and also that many errors are introduced when updating such a register, e.g. due to that the activity meter ID is difficult to read due to dirt or wear, and due to the human factor.

SUMMARY

The object is to obviate at least some of the problems outlined above. In particular, it is an object to provide a monitoring device, a sensor device and respective methods performed thereby for matching a sensor device to an animal identity, represented by an ID tag. These objects and others may be obtained by providing a monitoring device, a sensor device and a respective method performed by a monitoring device and a sensor device according to the independent claims attached below.

According to an aspect, a method performed by a monitoring device for matching a sensor device to an ID tag is provided. The sensor device and the ID tag are attached to an animal. The method comprises receiving information related to the ID tag from an ID reader device; and receiving sensor device information from the sensor device, said information comprising a sensor device identity, and an indication of that the transmission of the sensor device information from the sensor device was triggered by an ID reader device. The method further comprises determining that the ID tag and the sensor device are attached to the same animal based on time information associated with the respective received information, i.e. matching the ID tag and the sensor device.

According to an aspect, a method performed by a sensor device for supporting automatic matching to an ID tag is provided. The sensor device and the ID tag are attached to an animal. The method comprises detecting a signal from an ID reader device; and in response to the detected signal, transmitting sensor device information comprising a sensor device identity.

According to an aspect, a monitoring device for matching a sensor device to an ID tag is provided. The sensor device and the ID tag are attached to an animal. The monitoring device is configured for receiving information related to the ID tag from an ID reader device; and receiving sensor device information from the sensor device, said sensor device information comprising a sensor device identity, and an indication of that the transmission of the sensor device information from the sensor device was triggered by an ID reader device. The monitoring device is further configured for determining that the ID tag and the sensor device are attached to the same animal based on time information associated with the respective received information, i.e. matching the ID tag and the sensor device.

According to an aspect, a sensor device for supporting automatic matching to an ID tag is provided. The sensor device and the ID tag are attached to an animal. The sensor device is configured for detecting a signal from an ID reader device; and in response to the detected signal, transmitting sensor device information comprising a sensor device identity.

The method performed by the monitoring device, the method performed by the sensor device and the respective method performed thereby have several advantages. One advantage is that an ID tag and a sensor device may be automatically matched to each other, when being attached to the same animal, without cumbersome manual actions. Further, the probability of errors in the matching is significantly lower than for manual matching. It is further very advantageous that the invention enables automatic matching also when using standard ID systems and standard sensor device reading equipment and standard location and range strategy for such equipment. Another advantage is that a sensor device may be taken from one animal and be attached to another animal without having to take any manual actions for matching the sensor device with the ID tag of the new animal to which it is attached, since the matching is done automatically.

BRIEF DESCRIPTION OF DRAWINGS

Embodiments will now be described in more detail in relation to the accompanying drawings, in which.

DETAILED DESCRIPTION

Figure 1A:
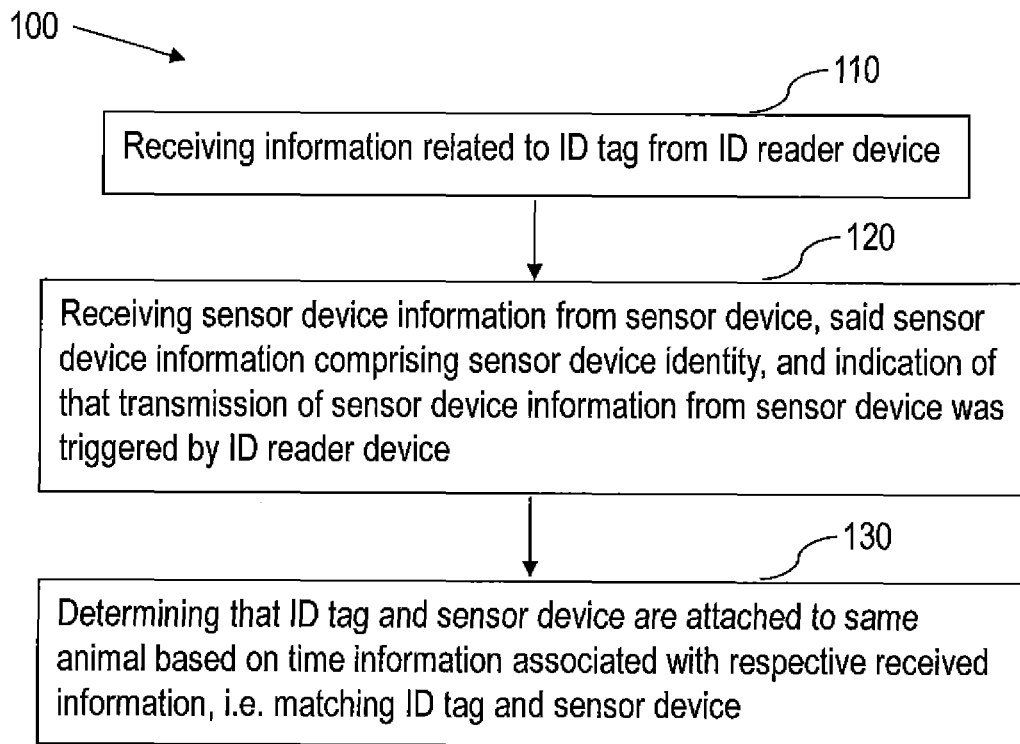
FIG. 1a is a flowchart of a method performed by a monitoring device for matching a sensor device to an ID tag, according to an exemplifying embodiment.

Briefly described, a monitoring device and a method performed by the monitoring device for matching a sensor device, such as an activity meter, to an ID tag, where said ID tag and sensor device are attached to an animal are provided. Provided are also a sensor device and a method performed by the sensor device for supporting automatic matching to an ID tag is provided.

Kept animals are often assigned a specific identity, ID, e.g. in form of a name and/or series of integers. In many farms this ID is attached to the animal in form of an ID tag, which may be e.g. an ear tag or a chip placed under the hide of an animal. Such an ID tag may be read automatically at different places in the area where the animals are kept, such as e.g. at a milking station or at a feed dispenser. This may be done in order to know which feed ration the animal should be supplied with by the feed dispenser, or for knowing how much milk a specific animal has produced during a certain period of time.

In order to obtain more detailed information about movements and/or activities of individual animals, they are equipped with an activity meter in addition to the ID tag. The activity meter senses, or detects, movements and/or activities of the animal to which it is attached and may store information relating thereto in a memory and may regularly, or by being otherwise triggered, send information to the monitoring device. There are also other types of sensors and sensor devices that could be used to monitor different properties or conditions of an animal. For example a sensor device, e.g. in form of a bolus, could be swallowed by an animal and in the rumen (the first stomach), sense, record and wirelessly report e.g. temperature, pH value and/or sounds. A bolus could, of course, also comprise a sensor for measuring activity. Herein, an activity meter will be used to exemplify a sensor device. However, embodiments of the invention are also valid for other types of sensors/sensor devices for measuring and reporting animal properties or conditions such as e.g. temperature, blood pressure, pH value, muscle activity (e.g. chewing), generated sounds (e.g. related to chewing/rumination) and/or exposure to sun or sounds. The sensor devices may be assumed to have an, at least locally, unique identification number or sequence (which it can transfer wirelessly), and to be intended for being placed on or in an animal. The properties of an activity meter described herein, e.g. in terms of identity, collecting information and sending reports may be assumed to be valid, mutatis mutandis, also for other types of sensor devices.

The information sent by the activity meter may comprise one or more measurement reports based on the stored sensed/detected movements and/or activities of the animal. The activity meter has its own identity in order to distinguish between different activity meters. Consequently, when the activity meter sends information to the monitoring device, the information generally comprises the identity of the activity meter in order for the monitoring device to understand which activity meter the information comes from.

The ID tags and sensor devices, such as activity meters are typically separate devices bought from separate suppliers, having different systems for indicating a unique identity. There is no communication between the two, and they have no knowledge about each other. In other words, the ID tag and the sensor device operate independently of each other. In order to know which animal is wearing or carrying e.g. a specific activity meter, the activity meter should be matched to the animal in some way. As previously mentioned, the current solution to do so is to manually register an activity meter as attached to an animal with a certain ID in a database or a register, resulting in lots of errors including missing and erroneous associations between activity meters and animals. Consequently, a monitoring device receiving information about movements and/or activities of an animal from an activity meter may not be able to determine to which animal the information refers. As stated above, the identity of ID tags and the identity of sensor devices are typically independent of each other and they may use different formats, and/or addressing technologies. Further, since they are two separate components, applied for different purposes, they do not communicate with each other, and since they typically use different technologies and transmission protocols for wireless communication, they are not able to communicate with each other. Typically, standard ID tags use RIFD technology, while sensor devices, which e.g. are to transmit more data than ID tags, use protocols such as Bluetooth or Wi-Fi. This means that they have separate readers/receivers. The RFID tags are read by an RFID reader, sending out an interrogation signal to activate the tag. Since it is important to identify the right animal e.g. in a feeding station and a milking station, the interrogation field used has a short range, in order not to capture/activate tags from animals in the vicinity of the actual animal in the feeding station/milking station. It is further important for ID tags to have a long life-time, preferably as long as the life-time of the animal. Since the purpose of the sensor devices and their transmissions is completely different form that of the ID tags, they use a different technology, have fewer receiving points and larger transmission range. For example, it is not an issue that more than one animal is located within the transmission range of the receiver, and thus may transmit data simultaneously to the receiver. The readers/receivers for ID tags and the receivers for sensor devices are typically not co-located.

Since the monitoring device also receives information from one or more ID reading devices, providing the monitoring device with information pertaining to which animal has moved close enough to the respective ID reading device for that ID reading device to read the ID tag of the animal and then send that information to the monitoring device, the monitoring device receives information from both the ID tag and the activity meter both being attached to the same animal.

The monitoring device needs to know which ID tag and which activity meter is being worn by, or attached to, the same animal, in order to make use of the information about the movements and/or activities of the animal received from the activity meter. The inventors have realised that since the ID tag and the activity meter are attached to the same animal; if they would transmit their identities almost simultaneously, the monitoring device would receive them almost simultaneously and would thereby be able to match them to each other by being received almost simultaneously. The inventors realized how this would be achievable for standard installations with minor adjustments to sensor device software and/or hardware, and thus be a very cost-efficient alternative to e.g. integrating ID tags and sensor devices, redesigning the whole installed equipment, or as previously done—manually connecting ID tag identifiers with sensor device identifiers e.g. by inserting and linking (matching) them in a computer system. One benefit of the invention is that standard ID tag and reader systems, which are very commonly used e.g. in dairy farms and cattle farms, can continue to be used as before, and any installed infrastructure for receiving sensor device data can also continue to be used as before. No extra readers or receivers need to be installed, as compared to previous arrangements, and the ID tags and sensor devices still do not need to use the same transmission protocol or technology.

Embodiments herein relate to a method performed by a monitoring device for matching a sensor device to an identity, ID, tag, where said ID tag and sensor device are attached to an (the same) animal. Various exemplifying embodiments of such a monitoring device will now be described with reference to FIGS. 1a and 1b.

FIG. 1a illustrates the method 100 comprising receiving 110 information related to the ID tag from an ID reader device; and receiving 120 information from the sensor device, said sensor device information comprising a sensor device identity, and an indication of that the transmission of the sensor device information from the sensor device was triggered by an ID reader device. The method 100 further comprises determining 130 that the ID tag and the sensor device are attached to the same animal based on time information associated with the respective received information, i.e. matching the ID tag and the sensor device.

The animal is wearing the ID tag, for example by having the ID tag attached to one of its ears, wearing the ID tag in a collar around its neck, or having it placed under the hide. The ID tag is operable to communicate wirelessly with an ID reader device. The ID reader device transmits a signal, which when read (perceived) by the ID tag triggers the ID tag to transmit is identity information. In a preferred embodiment, the ID tag and the ID reader device use so-called Radio Frequency Identification, RFID, since this is the most commonly used technology for ID in animal husbandry, but other solutions are possible, such as use of infrared light, microwaves or some other wireless short range communication. When the animal is within the vicinity of an ID reading device, i.e. when the ID tag is within the transmission range of the ID reading device, the ID reading device reads the ID tag attached to the animal after having triggered it to transmit its ID information. When the ID reading device has read the ID tag, the ID reader device sends the ID information, e.g. as an ID information report, to the monitoring device. In this manner, the monitoring device is informed of e.g. the whereabouts of the animal, such as that it has entered a certain milking station. The animal may be assumed to be within an animal enclosure where it can move around relatively freely, see e.g. FIG. 3, wherein the animal enclosure 300 may comprise a plurality of different ID reader devices at various places within the animal enclosure, e.g. at a fodder table 310, at a water station 330, at a resting area 320 and/or at a parlour 340. The animal enclosure may for example be a barn or a fenced open field, wherein the animal may move freely within the animal enclosure. Depending on which ID reader device that is sending the ID information report, the monitoring device may deduce where the animal is (i.e. close to which ID reader device it is located; not in a "GPS" positioning sense). The ID readers may be located at different places within the animal enclosures, so that when the animal is close to e.g. a water station in order to drink, an ID reader arranged at the water station sends the ID information report, wherein the monitoring device is informed that the animal is has just been detected being in the vicinity of, i.e. close to, the water station. Hereinafter, transmitting the ID information report may be referred to as merely transmitting ID information. It is pointed out that the ID reader device only reads the ID information of the ID tag, the ID reader device is unaware of the sensor devices and is not assumed to be capable of reading e.g. an activity meter identity. Consequently, the monitoring device receives the ID information of the ID tag from the ID reader device.

As an example, the animal wearing the ID tag is also wearing a sensor device, such as an activity meter, having an at least locally unique identification code or number, referred to as the activity meter identity (sensor device identity). The activity meter may be attached to the animal for example by the animal wearing a collar comprising the activity meter around its neck. The activity meter, which itself communicates using Bluetooth or WiFi (or similar), comprises an additional simple sensor or detector for detecting being in the vicinity of, i.e. within the short range beacon or field transmitted by an ID reader device operating e.g. using RFID. The above mentioned animal enclosure also comprises one or more receivers (Bluetooth, Wifi, etc.) for receiving transmissions from the activity meter(s), wherein the receiver(s) may forward transmissions received from the activity meter(s) to the monitoring device.

In a basic embodiment, the sensor device (e.g. activity meter) could be configured to be able to detect (receive) the type/s of ID reader devices which are the most commonly used within animal husbandry. For more flexible embodiments, the sensor device may be constructed for being able to detect (beacon) signals from more types of ID reader devices.

The monitoring device, which could alternatively be denoted e.g. control unit or matching device, may be a stand-alone unit or be comprised in, or be part of, another device, system or arrangement. There may be a system comprising different units or devices for measuring, monitoring and/or analysing activities, movements and other parameters associated with animals within the animal enclosure, wherein the monitoring device may e.g. be a part of such a system. For example, the monitoring device may be comprised in a so-called system controller, SC, in, or otherwise associated with, a barn or other environment where animals are kept.

The animal have attached to it its own unique ID tag and unique activity meter (sensor device), wherein the ID tag and activity meter are two different units with no communication between them as described above. The animal may move about within the animal enclosure. At one point, the animal is close to an ID reader device. The ID reader device reads the ID tag (after having triggered it to transmit its information) and transmits the information related to the ID tag to the monitoring device, which thus receives it 110. The activity meter, which is configured to detect or sense the ID reader device and also, in response to that, sends activity meter information comprising the activity meter identity, and the indication that the transmission of the activity meter information from the activity meter was triggered by the detection of the proximity of the ID reader device. In other words, the activity meter is configured to be triggered, by detecting a signal from an ID reader device, to transmit its identity and in this case also a special indicator. (The activity meter does not need to explicitly identify that it is an ID reader device that it is close to, it only needs to detect or identify a predefined type of signal). The ID reader device may be assumed to be completely unaware of the activity meter, and only operate according to a standard method. The monitoring device thus receives 120 the activity meter information comprising the activity meter information and the indication that the transmission of the activity meter information from the activity meter was triggered by the detection of the proximity of the ID reader device (i.e. by the detection of a predefined type of signal used by ID reader devices). The indication may be a flag comprising one or more bits. When the flag comprises one bit, the bit may be set to "0" or "1" in order to indicate whether the transmission of the activity meter information is due e.g. to a timer having lapsed so that a measurement report is to be sent to the monitoring device, or the transmission of the activity meter information is due to the activity meter having detected or sensed the ID reader device. When the flag comprises more than one bit, then a combination of "0" and "1" indicates that the transmission of the activity meter information is due to the activity meter having detected or sensed the ID reader device. Alternatively, the indication may correspond to the absence of a measurement report in the activity meter information, wherein the transmission of the activity meter information is triggered by the activity meter having detected or sensed the ID reader device. Another example of the indication is that the activity meter information is transmitted by the activity meter, and thus received by the monitoring device, at an irregular time when the monitoring device is not expecting to receive the activity meter information.

Since the ID reader device is triggered to send the information pertaining to the ID of the animal when the animal comes within the vicinity, i.e. within a certain range, of the ID reader device; and the activity meter is triggered to send the activity meter information comprising the activity meter identity when the animal comes within the vicinity, i.e. within a certain range, of the (same) ID reader device, the two transmissions occur relatively close in time. The monitoring device thus receives the transmissions relatively close in time, and can determine that the activity meter and the ID tag are attached to the same animal e.g. if the transmissions are received within a predefined time interval. A non-limiting example of relatively close in time is between 0 and 20 seconds. In other words, relatively close in time in this context means seconds or parts thereof, rather than minutes, at least when the capacity of any communication channels is not causing any delay. The time interval may be dimensioned based on e.g. the number of animals, the number of ID readers that are arranged within the animal enclosure. Generally, the more animals the more information may need to be transmitted on the communication medium between the ID reader(s) and the monitoring device. Also, the more ID readers being arranged within the animal enclosure, the more information may need to be transmitted on the communication medium between the ID reader(s) and the monitoring device. Depending on the medium, e.g. on the amount of resources of the medium, the number of animal and/or the number of ID readers, the delay between the transmissions may be shorter or longer. By dimensioning the time interval between reception of the respective transmissions, the monitoring device may deduce that the ID tag and the activity meter are attached to the same animal with a relatively high likelihood, especially for the case where no time stamp is added by the ID reader and/or the activity meter.

The monitoring device then determines, or decides, that the ID tag and the activity meter are attached to the same animal based on time information associated with the respective received information, i.e. the monitoring device matches the ID tag and the activity meter.

The amount of time passing between the reception of the transmission from the ID reader device (comprising ID information) and the reception of the transmission from the activity meter (comprising the activity meter identity) may vary depending on the amount of animals within the animal enclosure and the amount of activity of the animals. Merely as a non-limiting and illustrative example, if the time difference between the reception of the two transmissions is less than 5 seconds, the monitoring device may deduce that the ID tag and the activity meter are attached to the same animal, wherein the monitoring device matches the ID tag and the activity meter to each other.

The method performed by the monitoring device has several advantages. One advantage is that an ID tag and a sensor device, such as an activity meter may be automatically matched to each other, when being attached to the same animal, without cumbersome manual actions. Further, the probability of errors in the matching is significantly lower than for manual matching. Another advantage is that a sensor device may be taken from one animal and be attached to another animal without having to take any manual actions for matching the sensor device with the ID tag of the new animal to which it is attached, since the matching is done automatically.

The sensor device information may optionally also comprise a measurement report of registered movement(s), temperature, or similar, of the animal during a time interval.

As previously mentioned, an activity meter comprises a sensor that senses and registers the movements of the animal. One non-limiting example of such a sensor is an accelerometer. An accelerometer is typically an electromechanical device that measures motion and velocity to keep track of the movement and orientation of the accelerometer and thus the animal wearing the device. The activity meter also comprises a memory for storing information about sensed movements. The activity meter information sent when triggered by the proximity to an ID reader device may either comprise only the ID of the activity meter and the indication that it was triggered by a reader, and, it could also comprise a measurement report e.g. of the movements of the animal since the last transmission. An advantage of including the measurement report is that all transmissions from the activity meter are utilized for transfer of activity data. Another advantage may be one of simplicity, e.g. that the transmissions will be similar irrespective of whether it is a regular report or a transmission triggered by an ID reader device, with the possible exception of an explicit indication of that the transmission was triggered by an ID reader device being added when appropriate. In this type of embodiments, the monitoring device may both determine that the ID tag and the activity meter are attached to the same animal based on the activity meter identity as described above; and also obtain information about the movement(s) of the animal during the time interval.

The determining 130 of that the ID tag and the sensor device are attached to the same animal may comprise comparing time information associated with reading of the ID tag with time information associated with the sensor device information; and evaluating their separation in time.

By comparing the separation in time, the monitoring device may determine how likely it is that the received ID information and the received sensor device information (e.g. activity meter information) are correlated, meaning that the ID tag and the sensor device (activity meter) are attached to the same animal.

In preferred embodiments, where the received sensor device information comprises an indication of that the transmission has been triggered by the proximity to an ID reader device, the indicator enables the monitoring device to separate this transmission from a sensor device from other, regular, transmissions from said sensor device. Thereby, the monitoring device can conclude that the transmission from the sensor device is to be matched to information related to an ID tag received from an ID reader device, i.e. a received transmission from an ID reader device, and start analysing whether it has received any ID tag related transmissions within a certain time frame (related to the sensor device transmission) for a possible match. Most, or at least many transmissions received from the sensor devices will be "regular" transmissions, i.e. transmissions which have not been triggered by the proximity to an ID reader device. These regular transmissions should not be matched to ID tag related transmissions. Herein, when discussing matching between ID tag related information/transmissions and sensor device information/transmissions, it is non-regular sensor device transmissions that are meant, i.e. transmissions which have been triggered by the proximity to an ID reader device.

In one example, both of the received information related to the ID tag from an ID reader device (ID information) and the received sensor device information from the sensor device comprise a time stamp indicating e.g. the point in time they were transmitted. In such a case, the separation in time may be the difference in time with regard to the respective time stamp.

In another example, none of the received ID information and the received sensor device information comprises a time stamp, instead the monitoring device may determine the point(s) in time they are received, which is correlated to (or dependent on) the respective point(s) in time they were sent and/or triggered to be sent. The separation in time may then be the difference in time between the reception of the received ID information and the received sensor device information. The ID reader device and the antenna receiving transmissions from the sensor device may communicate with the monitoring device by means of wireless and/or wired communication. There may be a delay between the transmission(s) from the ID reader device and from the antenna until the respective transmission(s) are received by the monitoring device. The delay may depend e.g. on number of animal within the animal enclosure and/or the amount of activity occurring amongst the animals and the capacity of the communication channels. In other words, the heavier the load on the communication medium (radio resources or wired resources), the longer the delay between the transmission from ID reader device and/or the antenna to the reception at the monitoring device.

However, some or all of these factors may be taken into account when implementing the monitoring device and other units and/or devices. One example of such implementations is to have a threshold related to separation in time between the reception of the ID information and reception of the sensor device information (i.e. sensor device information determined to have been triggered by the proximity to an ID reader device). In such an implementation, if the separation in time is lower than the threshold, e.g. meeting the threshold, the monitoring device determines that the ID tag and the sensor device are attached to the same animal. Likewise, if the separation in time is larger than the threshold, e.g. not meeting the threshold, the monitoring device cannot determine that the ID tag and the sensor device are attached to the same animal. The threshold may be set by means of implementation wherein consideration may be taken to the maximum or average number of animals that may or is expected to be within the animal enclosure.

The determining 130 of that the ID tag and the sensor device are attached to the same animal may be based on a plurality of pairs of received information related to the ID tag (received from the ID reader device) and from the sensor device (received from the sensor device).

Once a matching of identities between the ID tag and the sensor device has been made (i.e. the monitoring device has determined that the ID tag and the sensor device are attached to the same animal), the monitoring device may store the matching of identities as a pair of received information, from the ID reader device and the sensor device respectively, constituting a match. Consequently, there may already be one or more matchings between the ID tag and the sensor device when the monitoring device receives 110 the information related to the ID tag from the ID reader device, and receives 120 the information from the sensor device, said information comprising the sensor device identity and the indication of that the transmission was triggered by an ID reader device.

The monitoring device may use stored information about one or more pairs of received information related to the ID tag and from the sensor device to match the ID tag and the sensor device.

It may be that there is a separation in time between their (ID information and sensor device information) respective reception time at the monitoring device making the matching on the edge of being uncertain, e.g. if the separation in time is very close to the above described threshold. However, by basing the matching on a plurality of (e.g. consecutive) samples of pairs of received information related to the ID tag and the sensor device, the monitoring device may obtain a more reliable matching result. This could be done for all matchings, or for certain cases e.g. where separation in time is close to a threshold, and/or when a sensor device is suddenly matched to a new ID tag, i.e. another ID tag than for previous matches (which could happened when the sensor device is moved from one animal to another). For the case with a match to a new ID tag, the monitoring device could collect more samples of matches before associating the sensor device and the ID tag in a register or database.

On the other hand, if the separation in time is so long that it is unlikely that the ID tag and the sensor device are attached to the same animal, e.g. if the separation in time is longer than the above described threshold, the monitoring device may determine that the activity tag has been removed from one animal (the one according to the stored matching pair(s)) to a new animal having another ID tag. Several samples may be used also in this case.

It may also be that the monitoring device may with relatively high probability determine that the sensor device and ID tag are attached to the same animal (e.g. they are received relatively close in time) and also by looking at stored matches allows the monitoring device to also determine that the sensor device has been moved from one animal to another animal. If so, the monitoring device may be configured to generate an indication to an operator that a new match has been determined confirming to the operator that the change of animal with regards to the sensor device has been recognised. The monitoring device may then further be configured to delete the old stored matchings associated with the sensor device and store the latest matching.

Figure 1B:
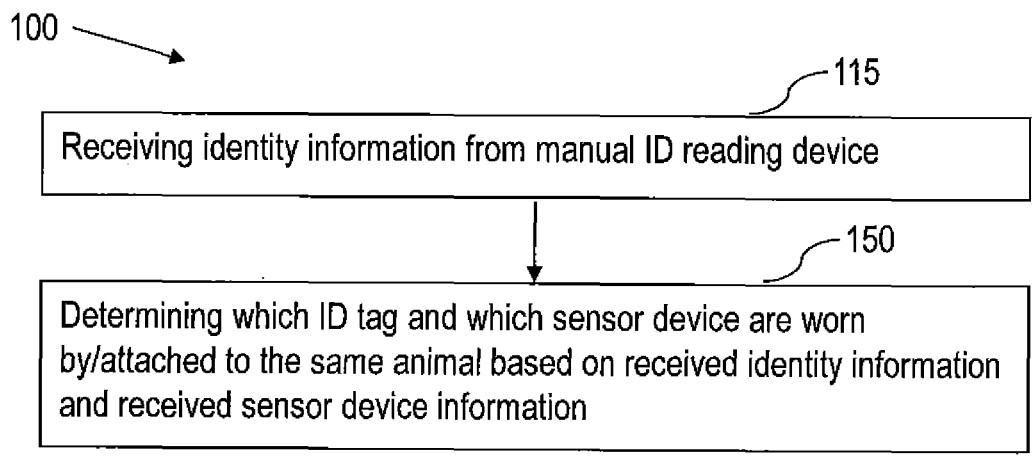
FIG. 1b is a flowchart of a method performed by a monitoring device for matching a sensor device to an ID tag, according to another exemplifying embodiment.

The indication of that the transmission of the sensor device information was triggered by an ID reader device (i.e. the detection of the ID reader device) may indicate that the transmission of the sensor device information was triggered by a manual ID reader device, wherein the method further comprises receiving 115 identity information from the manual ID reading device, and determining 150 which ID tag and which activity detector are attached to, or worn by, the same animal based on the received identity information and the received sensor device information, see also FIG. 1b.

As a complement or alternative to the one or more ID reader devices, which are usually statically mounted at various places within the animal enclosure, there may be a manual ID reader device, e.g. handled by a human, which manual ID reader device may trigger the transmission of sensor device information from the sensor device and the transmission of ID information from the ID reader device. For example, a person may have a handheld ID reader device and use it in order to trigger a matching between the ID tag and the sensor device being attached to the same animal.

Merely as an example, an activity meter may be moved from one animal to another. When the activity meter is attached to the new animal, the manual ID reading device may be used to provide a first set of information to the monitoring device that may hopefully result in a matching between the ID tag and the activity meter. In another example, where all animals in an identified group are supposed to wear activity meters, the monitoring device may provide information that a specific ID tag (within said group) has not been matched to/with any activity meter. This may be due to the activity meter having fallen off the animal, the activity meter malfunctioning, or failure to attach an activity meter to the animal.

Generally, a sensor device, such as an activity meter, sends information comprising measurement report(s) at regular time intervals, wherein the monitoring device may be expecting such information to be received at corresponding regular time intervals. The transmissions of sensor device information comprising the sensor device identity and optionally also measurement report(s) from the sensor device outside such a regular time interval are generally caused by the sensor device detecting the ID reader device. Thus, sensor device information received outside the regular time intervals may be used as an indication of that the sensor device information is triggered by (the proximity to) an ID reader device.

Embodiments herein also relate to a method for supporting automatic matching to an ID tag, the method being performed by a sensor device attached to an animal. Exemplifying embodiments of such a method will now be described with reference to FIG. 2a-2c.

Figure 2A:
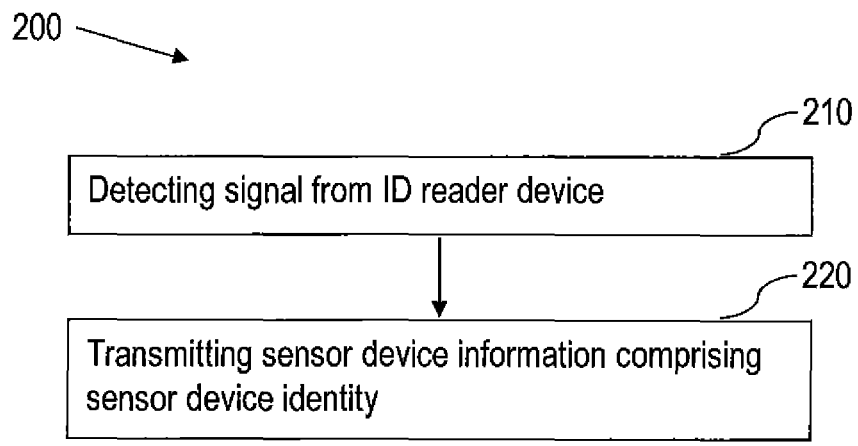
FIG. 2a is a flowchart of a method performed by a sensor device for supporting automatic matching to an ID tag, according to an exemplifying embodiment.

FIG. 2a illustrates the method 200 comprising detecting 210 a signal from an ID reader device; and in response to the detected signal, transmitting 220 sensor device information comprising a sensor device identity.

An activity meter may be attached to the animal for example by the animal wearing a collar comprising the activity meter around its neck and it comprises at least one sensor that senses movements such that the activity meter senses movements of the animal. As described above, the activity meter also comprises a sensor or a detector for detecting the ID reader device when the animal (and thus the activity meter) comes close to the ID reader device. It may be assumed herein that the ID reader device transmits a beacon (triggering/interrogation) signal or generates a specific type of electromagnetic field that can be detected by the activity meter. The beacon signal or electromagnetic field is sent/generated by the ID reader device in order for the ID tag to transmit its ID information. In other words, the ID reader device, triggers (by the beacon signal or field) the ID tag to transmit its ID information, such that it may be read/received by the ID reader device.

In a preferred embodiment, the ID tag and ID reader device referred to herein use RFID technology. At least for RFID technology, the electromagnetic field or signal transmitted by the ID reader device is referred to as an interrogation field or interrogation signal, since its purpose is to activate RFID tags in order to extract information from them.

The signal transmitted by the ID reader device in order to extract information from the ID tag may be e.g. a radio frequency signal or an electromagnetic field (typically the case for RFID), but it could alternatively be a signal of e.g. infrared light or microwaves, etc., as previously mentioned. Consequently, when the activity meter comes close enough to the ID reader device to detect the ID reader device, i.e. detecting the signal/electromagnetic field transmitted/generated by the ID reader device, the activity meter is triggered to send the activity meter information to the monitoring device.

The method performed by the sensor device has the same advantages as the method performed by the monitoring device as they are cooperating with each other. One advantage is that an ID tag and a sensor device may be automatically matched to each other, when being attached to the same animal, without cumbersome manual actions or expensive investments in new infrastructure. Further, the probability of errors in the matching is significantly lower than for manual matching. Another advantage is that a sensor device may be taken from one animal and be attached to another animal without having to take any manual actions for matching the sensor device with the ID tag of the new animal to which it is attached, since the matching is done automatically.

The sensor device information may optionally also comprise a measurement report e.g. of registered movements and/or other conditions (s) of the animal.

Also as described above, the sensor device may comprise at least one sensor, such as an accelerometer, that senses movements of the animal. An activity meter may store the sensed movements in a memory comprised in the activity meter, e.g. for and/or during a predetermined time interval, wherein that information is sent to the monitoring device in a measurement report comprised in the activity meter information. Merely as an illustrative example, assume that an activity meter sends activity meter information comprising measurement reports once an hour. If so, the activity meter senses and stores information associated with movements of the animal during one hour, sends the activity meter information comprising a measurement report for the animal's movement during the latest hour. The activity meter may optionally then delete the old information that has now been sent to the monitoring device and start storing new information associated with movements of the animal for the next hour. If the animal moves close enough to the ID reader device so that the activity meter detects a signal from the ID reader device, the activity meter is triggered to send information comprising at least the activity meter identity and the activity meter may optionally also include the measurement report of the stored movements of the animal irrespective of the hourly transmissions of activity meter information comprising measurement report(s).

The sensor device information transmitted to the monitoring device may further comprise an indication of that the sensor device information was triggered by the detection of the signal.

In order for the monitoring device to know that it should attempt to determine that the ID tag and the sensor device are attached to the same animal, the indication informs the monitoring device that this sensor device information should be matched to received ID information from an ID reader device.

An activity meter may send activity meter information comprising measurement reports regularly, e.g. each 15 minutes, each hour, once every 24 hours etc. depending on implementation in order for the monitoring device to collect information about the movements of the animal. Information about the movements of the animal may then be used for various purposes which are out of the scope of this disclosure. However, merely as an example, assuming the animal is a female animal and it is desirable to determine when the female animal is ready to be inseminated, her movements and/or movement patterns may give indications as to when she is ready. Consequently, the activity meter generally sends several instances of activity meter information comprising measurement reports during e.g. each 12 hours. These instances of activity meter information are sent irrespective of the animal being close to any ID reader device and may thus not be matched to ID tag(s). However, once a match between ID tag and activity meter is done, the monitoring device will know which animal is associated with received activity meter information comprising measurement reports.

Consequently, in order for the monitoring device to know that the activity meter information may be used to determine that the ID tag and the activity meter are attached to the same animal, the activity meter may optionally enclose an explicit indication of that the sending of the activity meter information is triggered by detecting the ID reader device. For the monitoring device, receiving of the indication will mean that corresponding information from an ID reader device should be available, i.e. that the ID reader device (triggering the sensor device transmission) will also send information, i.e. ID information, to the monitoring device. In this manner, the monitoring device may either confirm that the activity meter is still attached to the same animal as before e.g. using previous matchings or determine a new match between the activity meter and the ID tag in case the activity meter has been moved from one animal to another. A number of samples or matches could be collected and evaluated before an association between the activity meter and the ID tag is updated in a register.

It is pointed out that the monitoring device may determine that the sensor device information comprising the sensor device identity is sent by the sensor device as a result of detecting the ID reader device without the above described explicit indication. When the sensor device is configured to transmit sensor device information also comprising the measurement report at regular time intervals, the monitoring device will receive the information comprising the sensor device identity and the measurement report at regular time intervals. If the sensor device information is then received at a point in time outside the regular time intervals, the monitoring device may deduce that the sensor device information is sent as a result of the sensor device being triggered by the detection of the ID reader device. However, due to possible delay, such a scheme may be less reliable than including an explicit indication in the sensor device information clearly informing the monitoring device of the detection of the ID reader device.

Figure 2B:
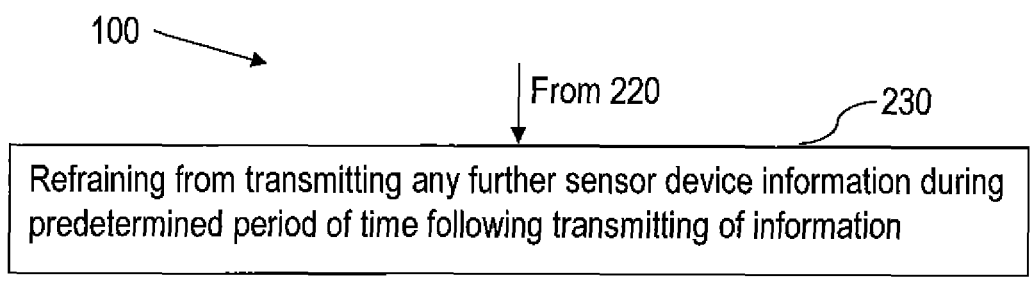
FIG. 2b is a flowchart of a method performed by a sensor device for supporting automatic matching to an ID tag, according to yet an exemplifying embodiment.

The method 200 may further comprise, as illustrated in FIG. 2b, refraining 230 from transmitting any further sensor device information comprising measurement report during a predetermined period of time following the transmitting of the information.

Once the sensor device has been triggered to send the sensor device information comprising the measurement report due to the detection of the ID reader device, the sensor device may optionally refrain from transmitting any further sensor device information comprising measurement reports during the predetermined period of time. This is in order to avoid multiple measurement reports to be transmitted which would not only be a waste of resources, but may possibly also cause increased delay to other traffic.

Consequently, an activity meter may refrain from transmitting any further activity meter information comprising measurement report(s) until the predetermined period of time has lapsed. During the predetermine period of time, the activity meter may sense and store information about movements of the animal and after the predetermined period of time, the activity meter may transmit that information either due to the activity meter regularly sending activity meter information comprising measurement report(s), i.e. at the next upcoming regular interval, or due to the animal again being close to an ID reading device triggering the activity meter to anew send information optionally comprising measurement report(s) to the monitoring device.

Figure 2C:
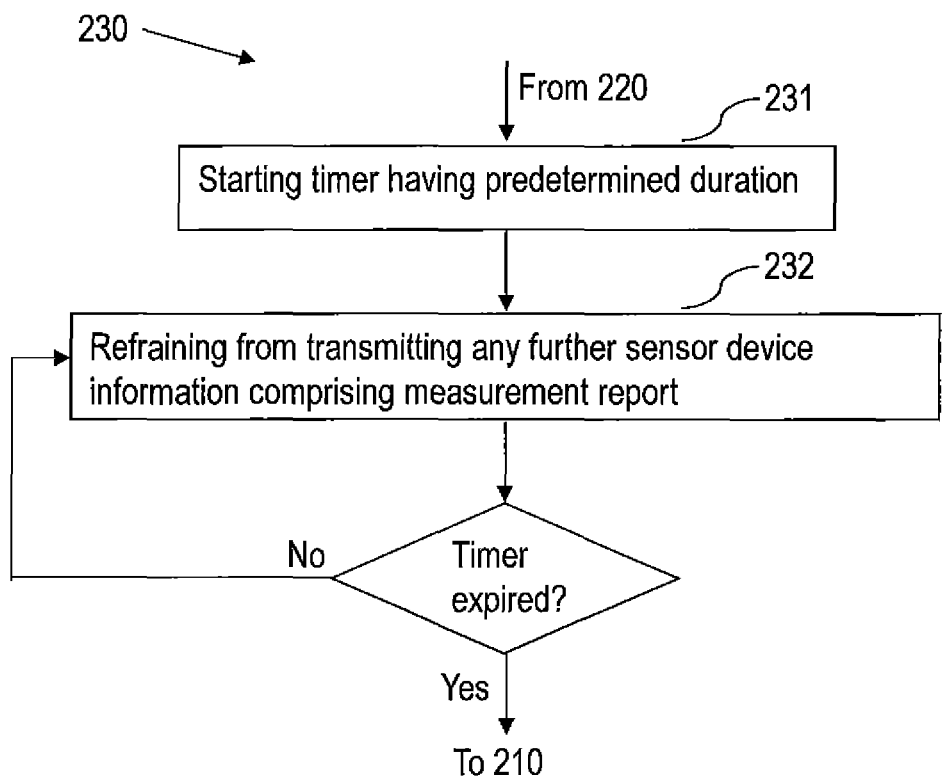
FIG. 2c is a flowchart of a method performed by a sensor device for supporting automatic matching to an ID tag, according to still an exemplifying embodiment.

An exemplifying implementation of refraining from transmitting any further sensor device information comprising measurement report(s) until the predetermined period of time has lapsed is illustrated in FIG. 2c.

Figure 3A:
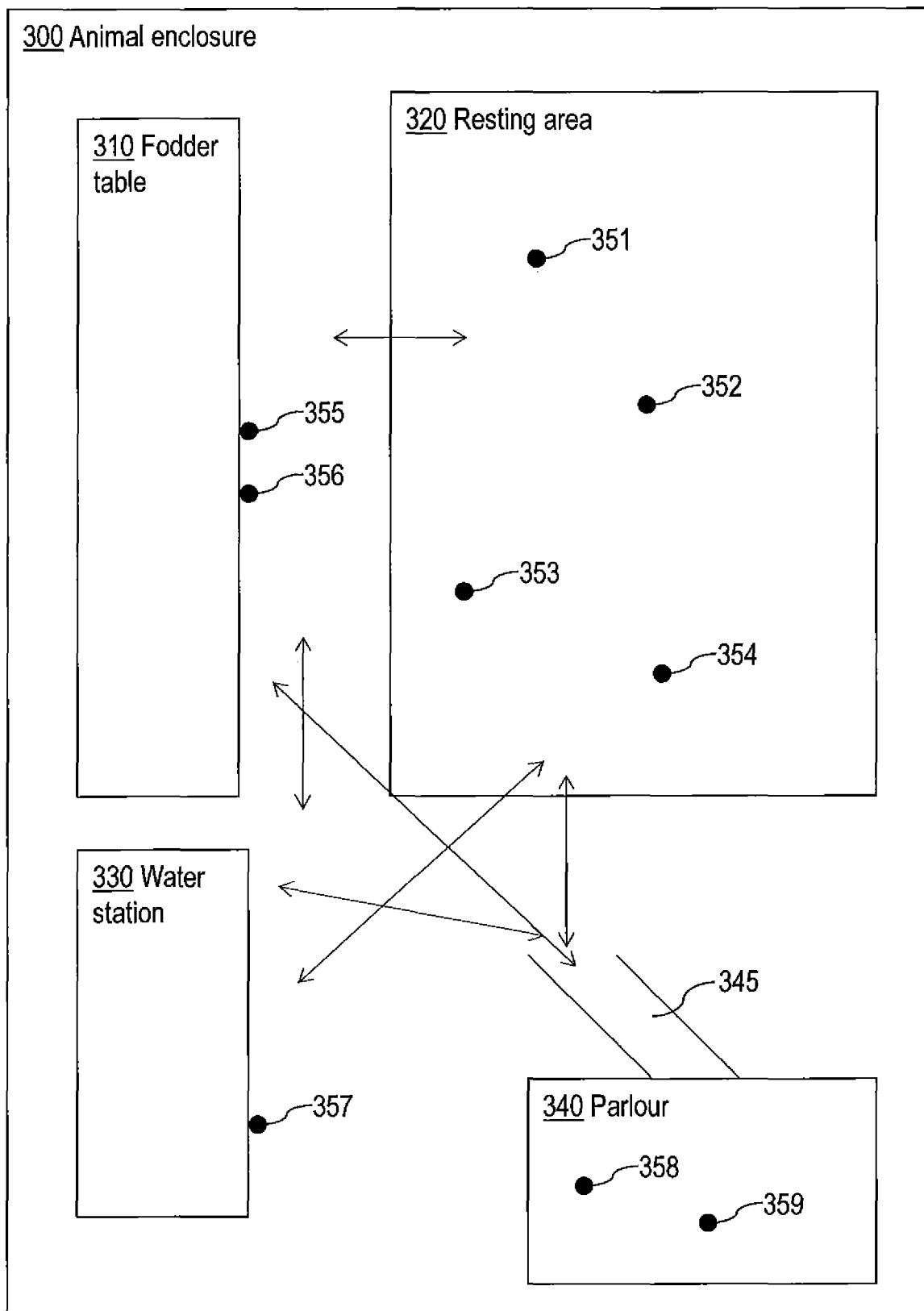
FIG. 3a is a schematic illustration of an animal enclosure.

FIG. 3a is an illustration of an animal enclosure 300. The animal enclosure may comprise a fodder table 310, a water station 330, a resting area 320 and/or at a parlour 340. Generally, there are a plurality of animals 351, 352, 353, . . . , 359, within the animal enclosure, wherein each animal is wearing a unique ID tag, i.e. a respective unique ID tag is attached to each individual animal. The animals may move freely within the animal enclosure, illustrated by the arrows of the figure. The animal enclosure 300 may further comprise a passage 345 to the parlour 340, wherein animals wanting to enter the parlour 340 must pass through the passage 345.

The animals may be any type animals, for example cow, goat, sheep, horse, dog, etc. The animal may be dairy animals, meat animals or breeding animals.

Within the animal enclosure 300, one or more ID reader devices may be arranged at one or more different places. One problem to handle is that more than one animal may be present simultaneously at the different places within the animal enclosure. This may result in several ID information transmissions from the ID reading device(s) occurring approximately at the same time as well as several activity meter (or other sensor device) information instances comprising activity meter identity and optionally also measurement reports being transmitted from different activity meters approximately at the same time. By placing an ID reading device e.g. at the passage 345 through which the animals may only pass one at a time, or perhaps only a few at a time, the transmissions of ID information and activity meter information may occur more in pairs at relatively distinct points in time. Merely as a simplified and illustrative example, assume that animal 358 enters the parlour 340 via the passage 345 followed by animal 359. Then the ID reader device will transmit a first ID information relating to animal 358 and then a second ID information relating to animal 359. The activity meter of animal 358 will send its activity meter information comprising its activity meter identity before the activity meter of animal 359 will send its information comprising its activity meter identity. Consequently, the monitoring device will receive a first ID information associated with animal 358 followed by a second ID information associated with animal 359; and a first activity meter identity associated with animal 358 followed by a second activity meter identity associated with animal 359. Even if there is a spacing in time between the reception of the first ID information associated with animal 358 and the first activity meter identity associated with animal 358, the monitoring device may determine that the ID tag of animal 358 is associated with activity meter of animal 358. Likewise with regard to animal 359. In this manner, the monitoring device may match ID tag of animal 358 with activity meter of animal 358, match ID tag of animal 359 with activity meter of animal 359.

Figure 3B:
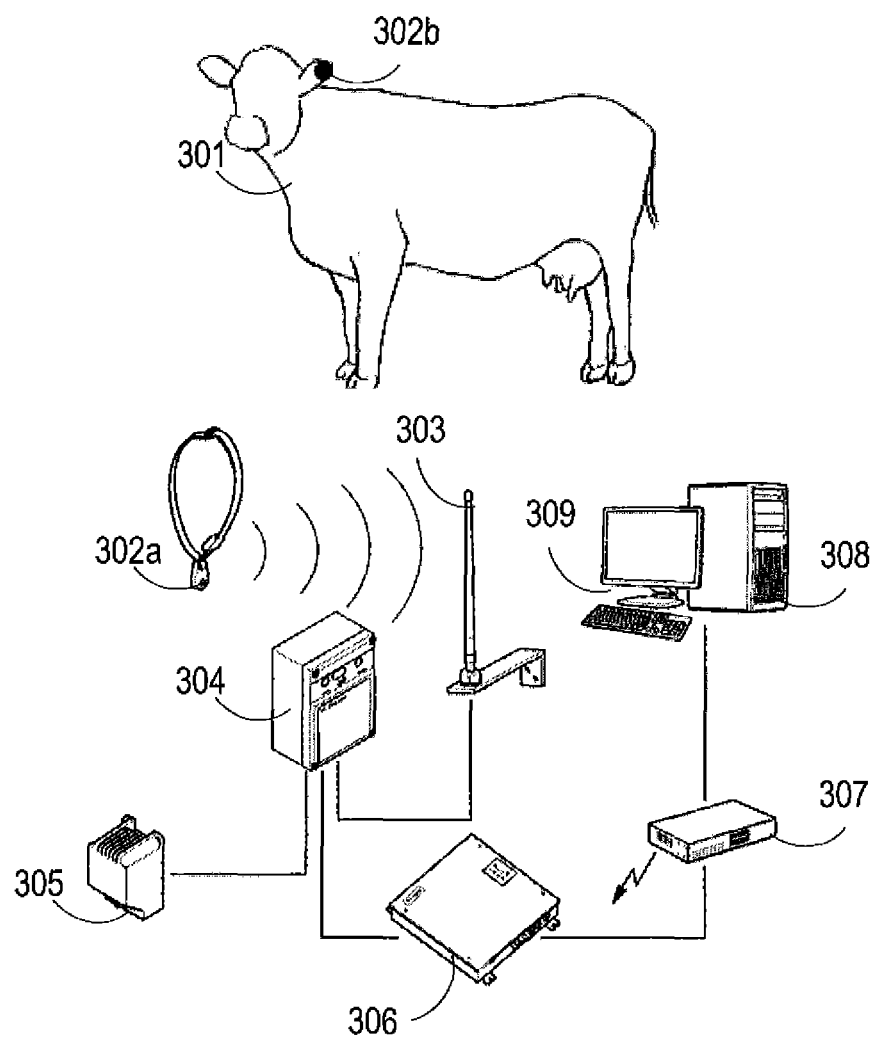
FIG. 3b is a schematic illustration of a monitoring system.

FIG. 3b shows a schematic overview of an example of a monitoring arrangement or system comprising an activity meter, ID tag and a control unit. The activity meter is, as previously stated, only an example of a sensor device. The activity meter 302a in this case may be an accelerometer, fastened e.g. around the neck of an animal 301. The activity device registers motion of the animal 301 and transfers this information wirelessly to a receiving unit 304 via an antenna 303 coupled to the receiving unit 304. The receiving unit 304 and the antenna may be powered by a power supply unit 305. The activity meter 302a could be described as being only an accelerometer, but should then be assumed to be supported by adequate equipment, such as, in this example, the receiving unit 304, the antenna 303 and the power supply unit 305. Alternatively, the devices 302-305 could be referred to as "a sensor" or "a sensor equipment". Information from the activity meter 302a may then be transferred to the monitoring device 308, via wire or wirelessly, e.g. via modems 306 and 307. The monitoring device 308 computer may be connected to a user interface, here illustrated as comprising a display and a keyboard 309. As mentioned, the arrangement or system may comprise a control unit, which in the exemplifying arrangement illustrated in FIG. 3b could be, or be implemented in, either the receiving unit 304, or in the computer 308. The control unit could be implemented as dedicated hardware and/or software configured to perform actions in the manner described above. The antenna 303, possible additional antennas or routers (not shown), the receiving unit 304 and the power supply unit 305 could be placed e.g. in a barn or other location where herd animals pass or dwell, e.g. by a feeding station or milking point, and/or by the entry or exit to a rotary platform. A similar setup as the one illustrated in FIG. 3b could be used for other sensors attached to an animal, such as a pedometer. FIG. 3b further illustrates the animal having attached to it an ID tag 302b. The ID tag 302b is illustrated as a black circle in the figure being fastened to an ear of the animal. However, the ID tag may alternatively be worn by the animal 301 in the same manner as the activity meter. The ID tag 302b may transmit ID information via ID readers (not shown in FIG. 3b), to the monitoring device 308, optionally also via the receiving unit 304 or via a separate receiving unit (not shown) dedicated for ID information.

Embodiments herein also relate to a monitoring device for matching an activity meter to an identity, ID, tag, where said ID tag and activity meter are attached to an animal. The monitoring device has the same technical features, objects and advantages as the method performed thereby as described above. The monitoring device will hence only be described in brief in order to avoid unnecessary repetition.

Figure 4:
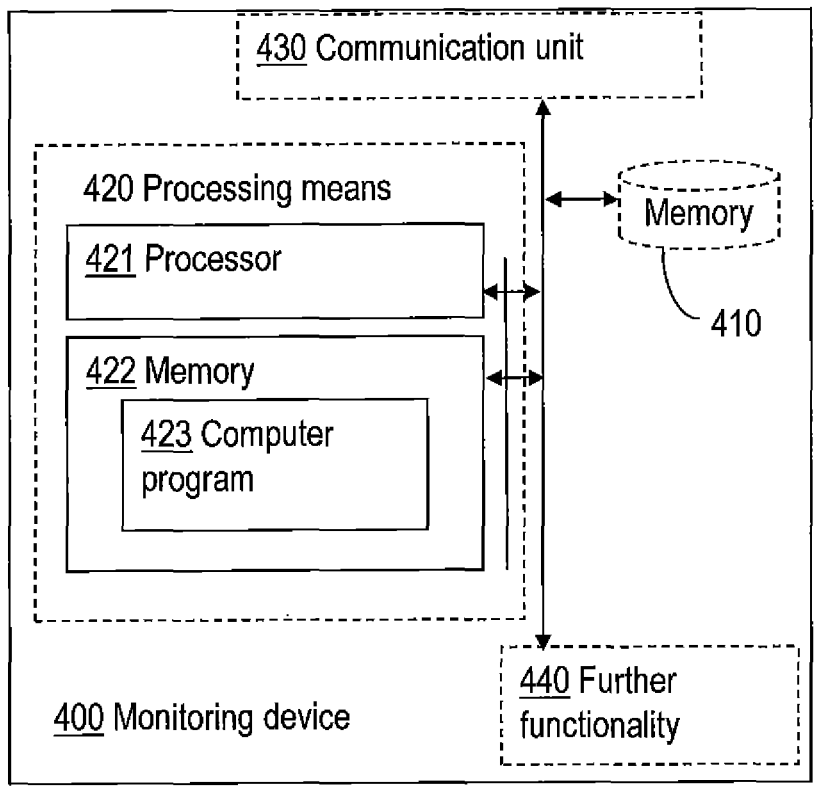
FIG. 4 is a block diagram of a monitoring device for matching a sensor device to an ID tag, according to an exemplifying embodiment.
Figure 5:
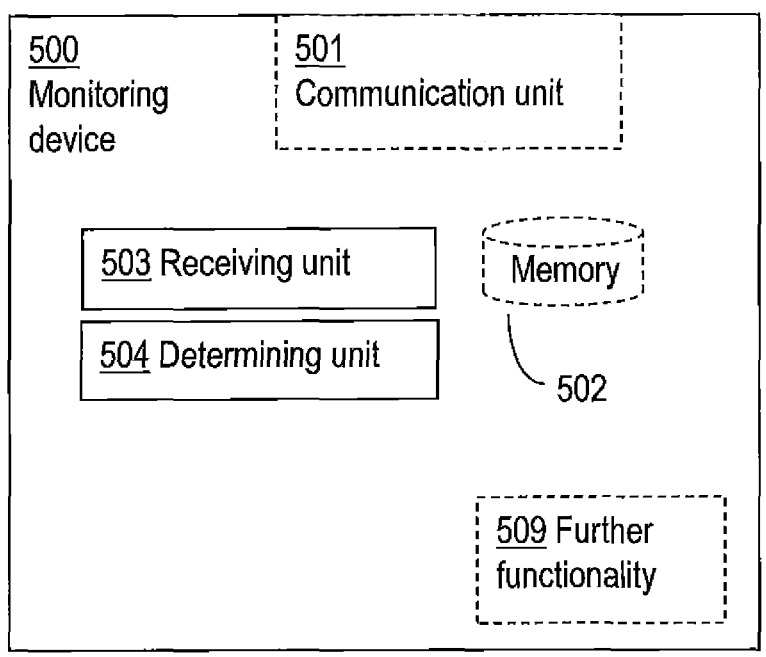
FIG. 5 is a block diagram of a monitoring device for matching a sensor device to an ID tag, according to another exemplifying embodiment.

The monitoring device will be described with reference to FIGS. 4 and 5. FIGS. 4 and 5 illustrate the monitoring device 400, 500 being configured for receiving information related to the ID tag from an ID reader device; and receiving sensor device information from the sensor device, said information comprising a sensor device identity, and an indication of that the transmission of the sensor device information from the sensor device was triggered by an ID reader device. The monitoring device 400, 500 further is configured for determining that the ID tag and the sensor device are attached to the same animal based on time information associated with the respective received information, i.e. matching the ID tag and the sensor device.

The monitoring device may be implemented or realised in different ways. A first exemplifying implementation or realisation is illustrated in FIG. 4. FIG. 4 illustrates the monitoring device 400 comprising a processor 421 and memory 422, the memory comprising instructions, e.g. by means of a computer program 423, which when executed by the processor 421 causes the monitoring device 400 to be operable for receiving information related to the ID tag from an ID reader device; and receiving sensor device information from the sensor device, said information comprising a sensor device identity, and an indication of that the transmission of the sensor device information from the sensor device was triggered by an ID reader device. The memory further comprises instructions, which when executed by the processor 321 causes the monitoring device 400 to determine that the ID tag and the sensor device are attached to the same animal based on time information associated with the respective received information, i.e. matching the ID tag and the sensor device.

FIG. 4 also illustrates the monitoring device 400 comprising a memory 410. It shall be pointed out that FIG. 4 is merely an exemplifying illustration and memory 410 may be optional, be a part of the memory 422 or be a further memory of the monitoring device 400. The memory may for example comprise information relating to the monitoring device 400, to statistics of operation of the monitoring device 400, information relating to animals being monitored by the monitoring device, just to give some illustrating examples. FIG. 4 further illustrates the monitoring device 400 comprising processing means 420, which comprises the memory 422 and the processor 421. Still further, FIG. 4 illustrates the monitoring device 400 comprising a communication unit 430. The communication unit 430 may comprise an interface through which the monitoring device 400 communicates with other devices and/or sensors associated with the animal e.g. the sensor device and the ID reader device. FIG. 4 also illustrates the monitoring device 400 comprising further functionality 440. The further functionality 440 may comprise hardware or software necessary for the monitoring device 400 to perform different tasks that are not disclosed herein.

An alternative exemplifying implementation of the monitoring device 400, 500 is illustrated in FIG. 5. FIG. 5 illustrates the monitoring device 500 comprising a receiving unit 503 for receiving information related to the ID tag from an ID reader device; and receiving sensor device information from the sensor device, said information comprising a sensor device identity, and an indication of that the transmission of the sensor device information from the sensor device was triggered by an ID reader device. The monitoring device 500 further comprises a determining unit 504 for determining that the ID tag and the sensor device are attached to the same animal based on time information associated with the respective received information, i.e. matching the ID tag and the sensor device.

In FIG. 5, the monitoring device 500 is also illustrated comprising a communication unit 501. Through this unit, the monitoring device 500 is adapted to communicate with other devices and/or sensors associated with the animal. The communication unit 501 may comprise more than one receiving arrangement. For example, the communication unit 501 may comprise one or more of a wire contact/connector or an antenna, by means of which monitoring device 500 is enabled to communicate with other devices and/or sensors associated with the animal, e.g. the ID tag and the sensor device. The monitoring device 500 is further illustrated comprising a memory 502 for storing data. Further, the monitoring device 500 may comprise a control or processing unit (not shown) which in turn is connected to the different units 503-504. It shall be pointed out that this is merely an illustrative example and the monitoring device 500 may comprise more, less or other units or modules which execute the functions of the monitoring device 500 in the same manner as the units illustrated in FIG. 5.

It should be noted that FIG. 5 merely illustrates various functional units in the monitoring device 500 in a logical sense. The functions in practice may be implemented using any suitable software and hardware means/circuits etc. Thus, the embodiments are generally not limited to the shown structures of the monitoring device 500 and the functional units. Hence, the previously described exemplary embodiments may be realised in many ways. For example, one embodiment includes a computer-readable medium having instructions stored thereon that are executable by the control or processing unit for executing the method steps in the monitoring device 500. The instructions executable by the computing system and stored on the computer-readable medium perform the method steps of the monitoring device 500 as set forth in the claims.

The monitoring device has the same advantages as the method performed by the monitoring device. One advantage is that an ID tag and a sensor device may be automatically matched to each other, when being attached to the same animal, without cumbersome manual actions. Further, the probability of errors in the matching is significantly lower than for manual matching. Another advantage is that a sensor device may be taken from one animal and be attached to another animal without having to take any manual actions for matching the sensor device with the ID tag of the new animal to which it is attached, since the matching is done automatically.

According to an embodiment, the sensor device information also comprises a measurement report e.g. of registered movement(s) or other conditions of the animal during a time interval.

According to an embodiment, the monitoring device 400, 500 is configured for determining that the ID tag and the sensor device are attached to the same animal by comparing time information associated with reading of the ID tag with time information associated with the sensor device information; and evaluating their separation in time.

According to yet an embodiment, the determining of that the ID tag and the sensor device are attached to the same animal is based on a plurality of pairs of received information related to the ID tag and from the sensor device.

According to still an embodiment, the indication of that the transmission of the sensor device information was triggered by an ID reader device indicates that the transmission of the sensor device information was triggered by a manual ID reader device, wherein the monitoring device 400, 500 further is configured for receiving identity information from the manual ID reading device, and determining which ID tag and which activity detector are worn by the same animal based on the received identity information and the received sensor device information.

Embodiments herein also relate to a sensor device for supporting automatic matching to an identity, ID, tag, the sensor device being attachable to an animal. The sensor device has the same technical features, objects and advantages as the method performed thereby as described above. The sensor device will hence only be described in brief in order to avoid unnecessary repetition.

Figure 6:
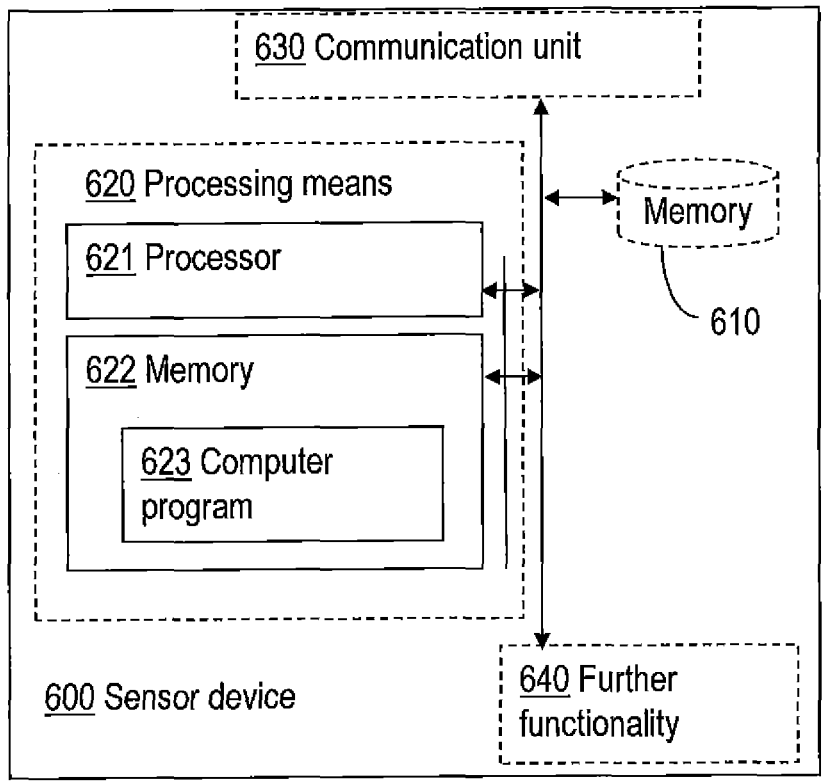
FIG. 6 is a block diagram of a sensor device for supporting automatic matching to an ID tag, according to an exemplifying embodiment.
Figure 7:
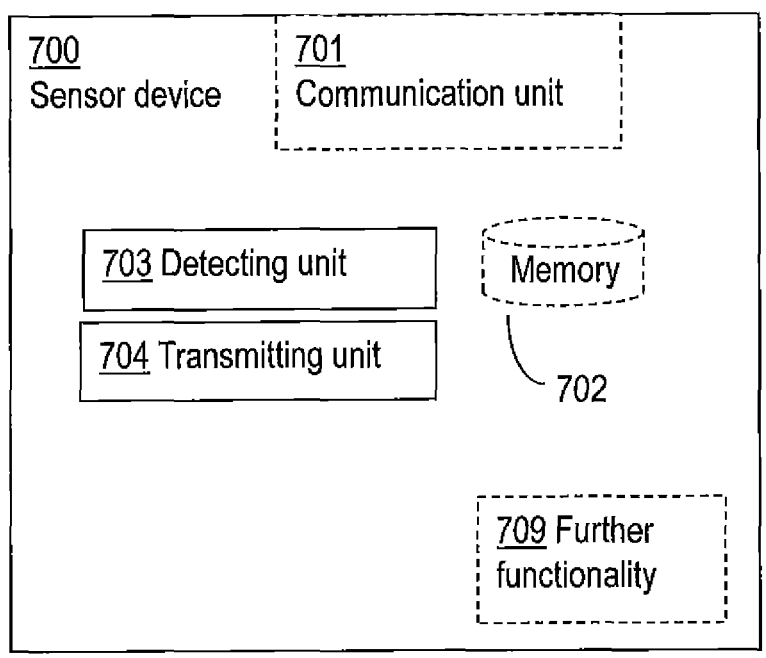
FIG. 7 is a block diagram of a sensor device for supporting automatic matching to an ID tag, according to another exemplifying embodiment.

The sensor device will be described with reference to FIGS. 6 and 7. FIGS. 6 and 7 illustrate the sensor device 600, 700 being configured for detecting a signal from an ID reader device; and in response to the detected signal, transmitting sensor device information comprising a sensor device identity.

The sensor device 600, 700 may be implemented or realised in different ways. A first exemplifying implementation or realisation is illustrated in FIG. 6. FIG. 6 illustrates the sensor device 600 comprising a processor 621 and memory 622, the memory comprising instructions, e.g. by means of a computer program 623, which when executed by the processor 621 causes the sensor device 600 to detecting a signal from an ID reader device; and to in response to the detected signal, transmitting sensor device information comprising a sensor device identity.

FIG. 6 also illustrates the sensor device 600 comprising a memory 610. It shall be pointed out that FIG. 6 is merely an exemplifying illustration and memory 610 may be optional, be a part of the memory 622 or be a further memory of the sensor device 600. The memory may for example comprise information relating to the sensor device 600, to statistics of operation of the sensor device 600, information relating to a parameter measured by the sensor device 600, just to give some illustrating examples. FIG. 6 further illustrates the sensor device 600 comprising processing means 620, which comprises the memory 622 and the processor 621. Still further, FIG. 6 illustrates the sensor device 600 comprising a communication unit 630. The communication unit 630 may comprise an interface through which the sensor device 600 communicates with other devices and/or sensors e.g. the monitoring device and the ID reader device. FIG. 6 also illustrates the sensor device 600 comprising further functionality 640. The further functionality 640 may comprise hardware or software necessary for the sensor device 600 to perform different tasks that are not disclosed herein.

An alternative exemplifying implementation of the sensor device 600, 700 is illustrated in FIG. 7. FIG. 7 illustrates the sensor device 700 comprising a detecting unit 703 for detecting a signal from an ID reader device; and a transmitting unit 704 for transmitting sensor device information comprising a sensor device identity in response to the detected signal.

In FIG. 7, the sensor device 700 is also illustrated comprising a communication unit 701. Through this unit, the sensor device 700 is adapted to communicate with other devices and/or sensors. The communication unit 701 may comprise more than one transmitting/receiving arrangement. For example, the communication unit 701 may comprise one or more antennas, by means of which sensor device 700 is enabled to communicate with other devices and/or sensors, e.g. the monitoring device, and to detect transmissions from an ID reader device. The sensor device 700 is further illustrated comprising a memory 702 for storing data. Further, the sensor device 700 may comprise a control or processing unit (not shown) which in turn is connected to the different units 703-704. It shall be pointed out that this is merely an illustrative example and the sensor device 700 may comprise more, less or other units or modules which execute the functions of the sensor device 700 in the same manner as the units illustrated in FIG. 7.

It should be noted that FIG. 7 merely illustrates various functional units in the sensor device 700 in a logical sense. The functions in practice may be implemented using any suitable software and hardware means/circuits etc. Thus, the embodiments are generally not limited to the shown structures of the sensor device 700 and the functional units. Hence, the previously described exemplary embodiments may be realised in many ways. For example, one embodiment includes a computer-readable medium having instructions stored thereon that are executable by the control or processing unit for executing the method steps in the sensor device 700. The instructions executable by the computing system and stored on the computer-readable medium perform the method steps of the sensor device 700 as set forth in the claims.

The sensor device has the same advantages as the method performed by the sensor device. One advantage is that an ID tag and a sensor device may be automatically matched to each other, when being attached to the same animal, without cumbersome manual actions. Further, the probability of errors in the matching is significantly lower than for manual matching. Another advantage is that a sensor device may be taken from one animal and be attached to another animal without having to take any manual actions for matching the sensor device with the ID tag of the new animal to which it is attached, since the matching is done automatically.

According to an embodiment, the sensor device information also comprises a measurement report. When the sensor device is an activity meter, the measurement report would comprise e.g. registered movement(s) of the animal.

According to an embodiment, the sensor device information further comprises an indication of that the sensor device information was triggered by the detecting of the signal.

According to yet an embodiment, the method further comprises refraining from transmitting any further sensor device information comprising a measurement report during a predetermined period of time following the transmitting of the information.

Figure 8:
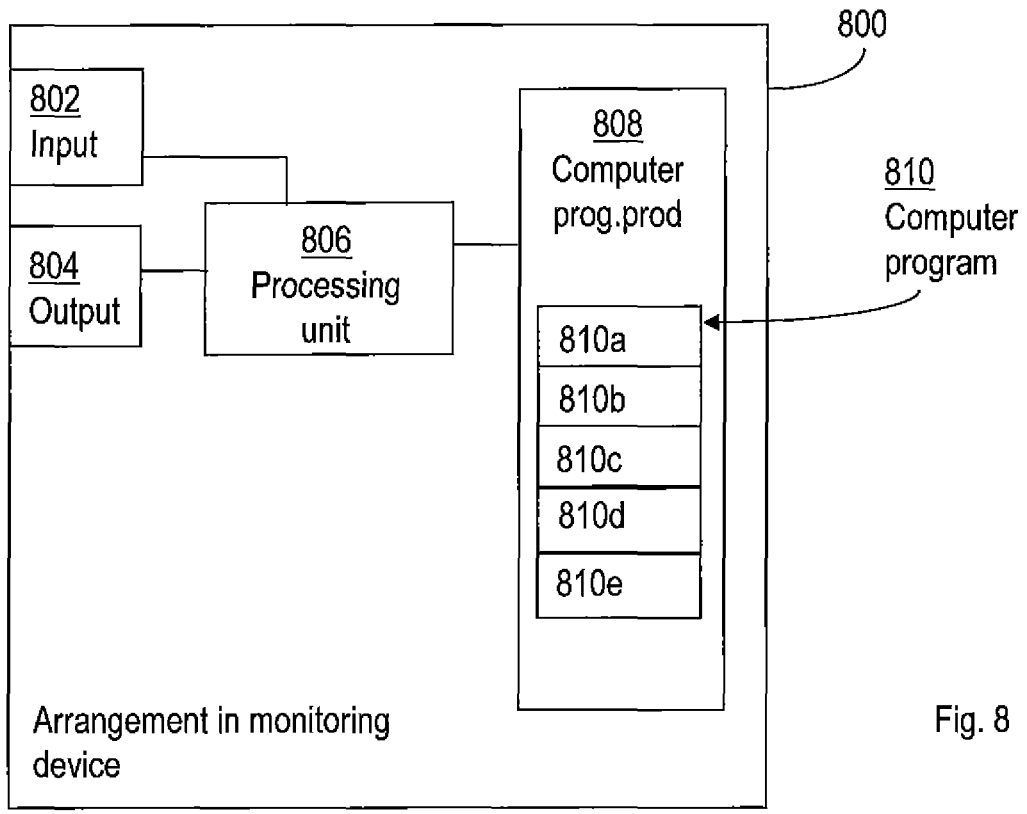
FIG. 8 is a block diagram of an arrangement in a monitoring device for matching a sensor device to an ID tag, according to an exemplifying embodiment.

FIG. 8 schematically shows an embodiment of an arrangement 800 in a monitoring device 500. Comprised in the arrangement 800 in the monitoring device 500 are here a processing unit 806, e.g. with a Digital Signal Processor, DSP. The processing unit 806 may be a single unit or a plurality of units to perform different actions of procedures described herein. The arrangement 800 in a monitoring device 500 may also comprise an input unit 802 for receiving signals from other entities, and an output unit 804 for providing signal(s) to other entities. The input unit and the output unit may be arranged as an integrated entity or as illustrated in the example of FIG. 5, as one or more interfaces 501.

Furthermore, the arrangement 800 in a monitoring device 500 comprises at least one computer program product 808 in the form of a non-volatile memory, e.g. an EEPROM, a flash memory and a hard drive. The computer program product 808 comprises a computer program 810, which comprises code means, which when executed in the processing unit 806 in the arrangement 800 in a monitoring device 500 causes monitoring device 500 to perform the actions e.g. of the procedure described earlier in conjunction with FIGS. 1*a*-1*b*.

The computer program 810 may be configured as a computer program code structured in computer program modules 810*a*-810*e*. Hence, in an exemplifying embodiment, the code means in the computer program of the arrangement 800 in a monitoring device 500 comprises a receiving unit, or module, for receiving information related to the ID tag from an ID reader device; and receiving sensor device information from the sensor device, said sensor device information comprising a sensor device identity, and an indication of that the transmission of the sensor device information from the sensor device was triggered by an ID reader device. The computer program further comprises a determining unit, or module, for determining that the ID tag and the sensor device are attached to the same animal based on time information associated with the respective received information, i.e. matching the ID tag and the sensor device.

The computer program modules could essentially perform the actions of the flow illustrated in FIGS. 1*a*-1*b*, to emulate the monitoring device 500. In other words, when the different computer program modules are executed in the processing unit 806, they may correspond to the units 503-504 of FIG. 5.

Figure 9:
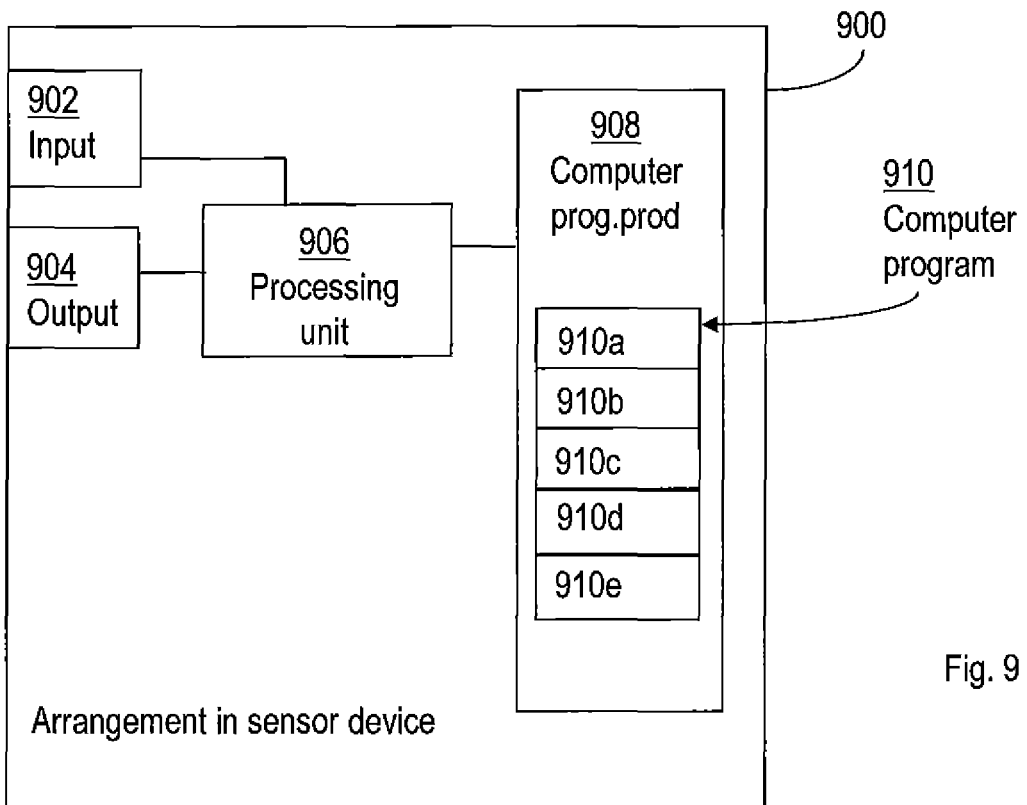
FIG. 9 is a block diagram of an arrangement in a sensor device for supporting automatic matching to an ID tag, according to an exemplifying embodiment.

FIG. 9 schematically shows an embodiment of an arrangement 900 in a sensor device 700. Comprised in the arrangement 900 in the sensor device 700 are here a processing unit 906, e.g. with a DSP. The processing unit 906 may be a single unit or a plurality of units to perform different actions of procedures described herein. The arrangement 900 in the sensor device 700 may also comprise an input unit 902 for receiving signals from other entities, and an output unit 904 for providing signal(s) to other entities. The input unit and the output unit may be arranged as an integrated entity or as illustrated in the example of FIG. 7, as one or more interfaces 701.

Furthermore, the arrangement 900 in the sensor device 700 comprises at least one computer program product 908 in the form of a non-volatile memory, e.g. an EEPROM, a flash memory and a hard drive. The computer program product 908 comprises a computer program 910, which comprises code means, which when executed in the processing unit 906 in the arrangement 900 in the sensor device 700 operable in the communication network causes sensor device 700 to perform the actions e.g. of the procedure described earlier in conjunction with FIGS. 2a-2c.

The computer program 910 may be configured as a computer program code structured in computer program modules 910a-910e. Hence, in an exemplifying embodiment, the code means in the computer program of the arrangement 900 in the sensor device 700 comprises a detecting unit, or module, for detecting a signal from an ID reader device; and a transmitting unit, or module, for transmitting sensor device information comprising a sensor device identity to the monitoring device in response to the detected signal.

The computer program modules could essentially perform the actions of the flow illustrated in FIGS. 2a-2c, to control the sensor device 700. In other words, when the different computer program modules are executed in the processing unit 906, they may correspond to the units 703-704 of FIG. 7.

Although the code means in the respective embodiments disclosed above in conjunction with FIGS. 5 and 7 are implemented as computer program modules which when executed in the processing unit causes the monitoring device and the sensor device to perform the respective actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the monitoring device and the sensor device respectively.

It is to be understood that the choice of interacting units, as well as the naming of the units within this disclosure are only for exemplifying purpose, and nodes suitable to execute any of the embodiments of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method for matching a sensor device to an identity (ID) tag, the ID tag and the sensor device being separate devices and both attached to an animal, the method comprising:
   using a handheld reader device to trigger transmission of sensor device information from the sensor device and trigger transmission of ID information from the ID tag; and
   determining and recording that the ID tag and the sensor device are attached to a same animal based on time information associated with both the ID information transmitted from the ID tag and the sensor device information transmitted from the sensor device.

2. The method according to claim 1, wherein when triggering the transmission of the ID information from the ID tag, the handheld reader device is within an operational receiving range of the ID tag.

3. The method according to claim 1, wherein the determining and recording is carried out by a monitoring device in communication with the handheld reader device.

4. The method according to claim 3,
   wherein the monitoring device receives the information related to the ID tag from the reader device, and computes the time information associated with the received information related to the ID tag and the sensor device information received from the sensor device, and
   wherein the monitoring device is configured to determine that the ID tag and the sensor device are attached to the same animal and store information associating the ID tag with the sensor device when a time difference between reception of the received information related to the ID tag and reception of the received sensor device information is less than or equal to a predetermined threshold.

5. The method according to claim 1, wherein the sensor device information includes a measurement report of movements made by the animal during a time interval.

6. The method according to claim 1, wherein said sensor device information including a sensor device identity.

7. A system for matching a sensor device to an identity (ID) tag, the ID tag and the sensor device being separate devices and both attached to an animal, the system comprising:
   a handheld reader device configured to trigger transmission of sensor device information from the sensor device and trigger transmission of ID information from the ID tag; and
   a monitoring device, in communication with the handheld reader device and configured to determine and record that the ID tag and the sensor device are attached to a same animal based on time information associated with both the ID information transmitted from the ID tag and the sensor device information transmitted from the sensor device.

8. The system according to claim 7,
   wherein the monitoring device is configured to receive the information related to the ID tag from the reader device, and compute the time information associated with the received information related to the ID tag and the sensor device information received from the sensor device, and
   wherein the monitoring device is further configured to determine that the ID tag and the sensor device are attached to the same animal and store information associating the ID tag with the sensor device when a time difference between reception of the received information related to the ID tag and reception of the received sensor device information is less than or equal to a predetermined threshold.

9. The system according to claim 7, wherein the sensor device information includes a measurement report of movements made by the animal during a time interval.

* * * * *